Sept. 1, 1959   A. W. HOUSE   2,902,309
PORTABLE HANDLE FOR MILK CONTAINER AND THE LIKE
Filed April 7, 1958
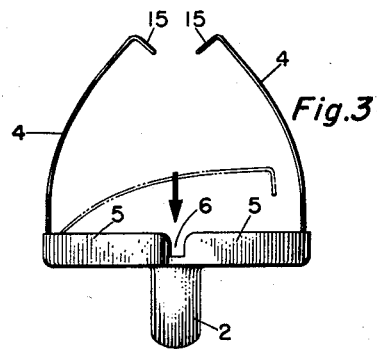
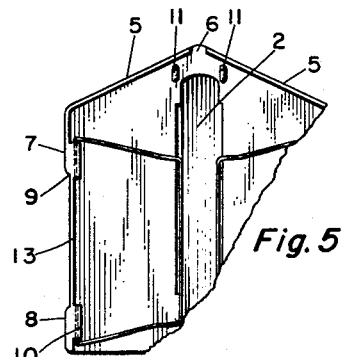
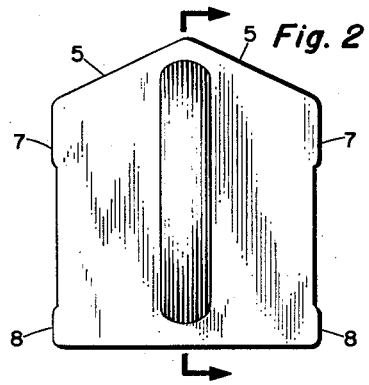
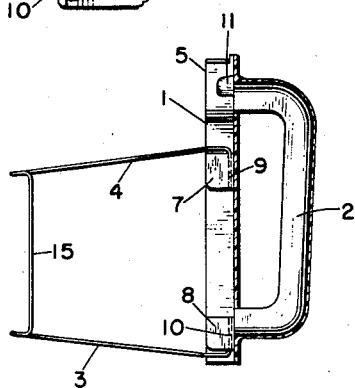
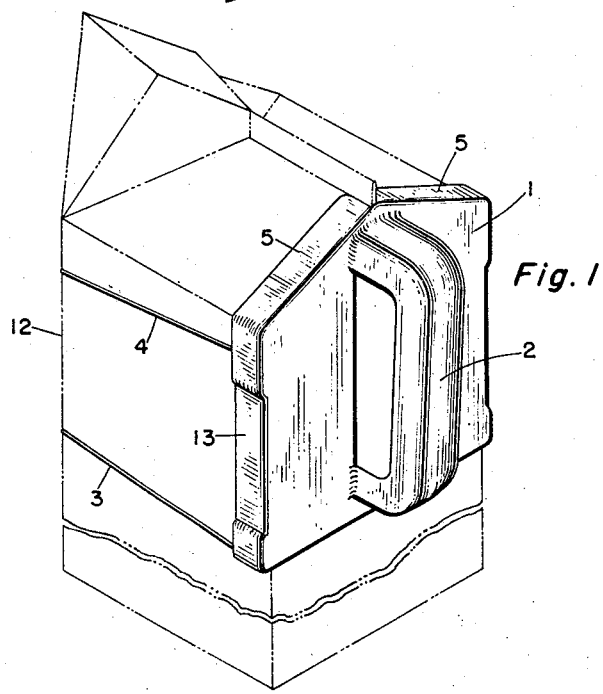
INVENTOR.
ARTHUR W. HOUSE
BY

United States Patent Office

2,902,309
Patented Sept. 1, 1959

2,902,309

PORTABLE HANDLE FOR MILK CONTAINER AND THE LIKE

Arthur W. House, Hazardville, Conn.

Application April 7, 1958, Serial No. 726,948

2 Claims. (Cl. 294—27)

This invention is concerned with a novel means for holding large containers by a removable handle. With the advent of cartons which are now being used to replace glass bottles in the distribution of milk and other commodities, it has become quite burdensome for the user, for example, of a milk carton, to pour same conveniently, in view of the large size and weight.

It is a principal object of the within invention to provide a removable type handle assembly which will fit containers for which it is designed for facilitating the use and purpose of the containers.

It is yet another object of the within invention to provide a secure means for preventing accidents in the handling of containers.

It is still another object of the within invention to provide a novel storage saving feature for the article, both for the purpose of packaging the article in its sales distribution, and also for saving space in the home.

It is still an additional object of the within invention to provide a handle that is inexpensive to manufacture, simple in construction, and easily employed by one not having knowledge of mechanics.

These and other objects are obtained by the use of a simple flat handle portion that has outside flanges that adapt themselves to receive a container for which the handle has been designed. Secured to this portion is a clamping means, preferably made of a wire which grips and holds the container.

This invention may be more readily understood by reference to the following specification and to the drawing in which:

Figure 1 is a perspective view of the handle secured about a typical milk container of the one-half gallon size.

Figure 2 is a front elevational view of the handle portion.

Figure 3 is a view looking down upon Figure 2 and showing the clamping arms of the device from the said position.

Figure 4 is a side elevational view looking towards the side of Figure 2.

Figure 5 is a view looking into the rear of the handle portion as shown in Figure 1.

In Figure 1 a typical half-gallon milk container of the cardboard variety 12 is indicated in dotted lines. Mounted at the front portion of this container 12 is the article of this invention. The portion 1 shall be hereinafter referred to as the main portion or the handle portion. Mounted on the main portion 1 is the handle 2, which is integral therewith and which has been molded integrally therewith and made a part thereof. The main portion 1 has flanges 5 and 13 circumscribing its outer perimeter at the top and at the side, but not at the bottom. At the top, on each side in the diagonal planes are the flanges 5. Along the sides vertically are the flanges 13. Mounted into the flanges 13, or integral therewith, are the abutments at the bottom, indicated by the numeral 8 and at the top by the numeral 7. These abutments are actually solid pieces of the same material from which the article is made. Mounted securely within these abutments are the vertical portions hereinafter called the arm connectors 9 and 10 of the clamping arms 4 and 3, respectively. The connectors are imbedded into an opening which can be seen by the dotted lines in the views of Figure 4 and Figure 5.

The clamping arms 4 and 3 are actually a unitary piece of wire having a middle portion 15. The middle portion 15 bends around to the rear of the container 12, away from the plane of the arms 3 and 4. This permits the grabbing action of the clamps. In conjunction with the clamping arm arrangement as just described, there is mounted, on the top of and on the inside surface of the main portion 1, the anchor knobs 11 which protrude from the inner surface of 1 a fraction of an inch. The purpose of the anchor knobs 11 is to secure the upper portion of the carton 12 with the flanges 5. The clamps, as already mentioned, are made of wire and have a certain amount of spring tension. Accordingly, once the clamps have been locked about the rear of the container, they are exerting pressure against the inner surface of the main portion 1, which makes for a tight frictional connection. The anchor knobs 11 prevent the main portion 1 from slipping. The abutments 7 and 8, besides supporting the gripping members or clamping portions 3, 4, and 15, act as a wedge between the vertical flanges 13 and the container 12, causing tight frictional engagement.

At the top of the flanges 5 there is an opening indicated by the numeral 6, which permits the upper portion of the container, which is shown herein as 12, to remain unobstructed by the article herein described.

It is to be pointed out that the tight frictional connection made by the cooperation of the anchor knobs 11 with the flanges 5 prevent this article from slipping from the container.

Further, the arrangement is such that the handle portion may be easily removed from the carton container and may be placed upon another similar carton container, with hardly any effort on the part of the user.

In operation it is to be noted that the clamping arms will rotate on their vertical portions 9 and 10 and will rotate from the flanges along the side of the main portion 1, indicated by the numeral 13, inwardly towards each other, as shown by the dotted lines in Figure 3. Actually the clamps may lie flat against the inside surface of the main portion 1 with one on top of the other.

This feature simplifies the packing of the inner portion in transfer from the manufacturer to the consumer, as well as saving storage space in the home of the user.

When the user desires to take this handle portion and put it upon a milk container, it is only necessary that he extend the clamping portions 3, 4, and 15 outwardly from the surface of the inside of the main portion 1 and place the main portion 1 along the part of the carton for which its contour is adapted, as indicated in the view of Figure 1. Thereupon, the spring tension of these clamping members may be exerted and the rear portions thereof, 15, may be pulled around to the rear of the carton 12. As already stated, the anchor knobs 11 will be pushing up against the container wall against flanges 5. The clamping members 15 will be pushing toward the inner surface of the main portion 1 from the rear of the container.

The user will then find that he has a handle which would appear to belong upon and be a part of the carton and will feel safe in pouring milk and other liquid from the carton, since no slipping of the handle portion can take place, either vertically or horizontally.

Having thus described my invention, I claim:

1. A removable handle assembly for containers and the like having a main portion said main portion having upper and side flanges along its upper and vertical perimeters, said flanges vertical with the plane of said main portion, anchor knobs extending from the inside surface of the main portion and proximate the upper flanges, a pair of clamping members extending from said main portion and proximate the said flanges, said clamping members having gripping means for engaging said container and exerting pressure whereby said container is held in tight engagement by said gripping means, by said anchor knobs, and by said flanges, and a handle integral with the said main portion.

2. A removable handle assembly for containers and the like having a main body portion, said body portion having an inside surface and an outside surface, a handle extending from said outside surface, side and upper flanges extending away from said handle along the upper and vertical perimeters of the main portion, anchor knobs near the upper flanges on the main portion and extending from the inside surface, an upper and lower abutment on each side of said main portion having an opening therein, a pair of clamping arms, each of said arms consisting of an upper, lower, and connecting portion, said upper and lower portion having means for enabling the arm to be movably mounted in said openings of said abutments, said arms being resilient, whereby when said connecting portion of said arms is gripping a container, a pressure will be exerted against said container, causing said container to be in tight engagement with said anchor knobs, said abutments, and said flanges.

References Cited in the file of this patent

UNITED STATES PATENTS

| | | |
|---|---|---|
| 1,446,474 | Mahnken | Feb. 27, 1923 |
| 2,029,051 | Blevins | Jan. 28, 1936 |
| 2,215,402 | McDonald | Sept. 17, 1940 |
| 2,757,034 | Puhl | July 31, 1956 |
| 2,782,064 | Montgomery | Feb. 19, 1957 |